I. & E. SALTSMAN.
FENCE.
No. 188,030. Patented March 6, 1877.
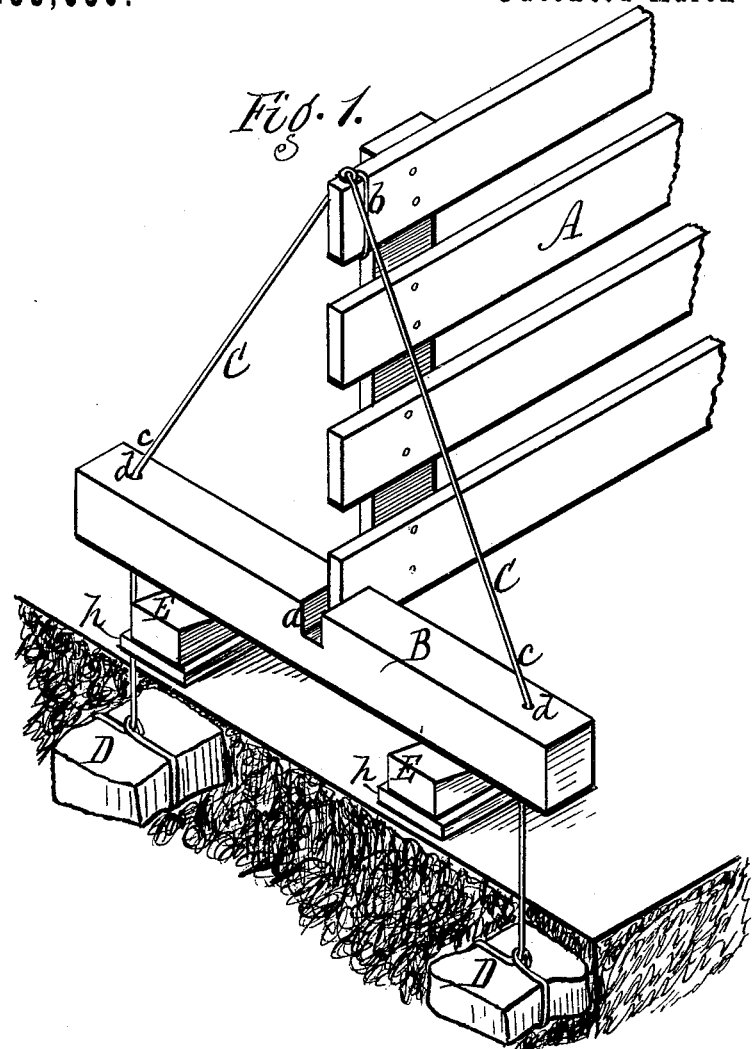
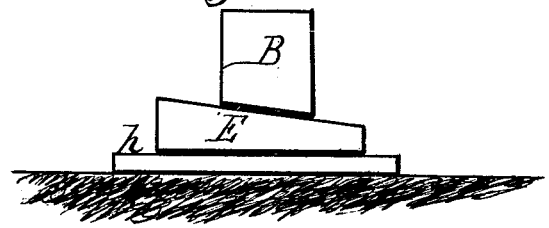
Witnesses.
Jacob Sprhs
Edwin Scott
Inventors.
Irvin Saltsman,
Elijah Saltsman,
per R. F. Osgood, Atty.

UNITED STATES PATENT OFFICE.

IRVIN SALTSMAN AND ELIJAH SALTSMAN, OF AVOCA, NEW YORK.

IMPROVEMENT IN FENCES.

Specification forming part of Letters Patent No. 188,030, dated March 6, 1877; application filed October 7, 1876.

*To all whom it may concern:*

Be it known that we, IRVIN SALTSMAN and ELIJAH SALTSMAN, both of Avoca, in the county of Steuben and State of New York, have invented a certain new and useful Improvement in Fences; and we do hereby declare that the following is a full, clear, and exact description of the construction and operation of the same, reference being had to the accompanying drawings, in which—

Figure 1 is a perspective view of our improvement. Fig. 2 is a detail view, showing the method of tightening the fence up against the anchor-wires.

Our improvement relates to portable fences, braced and sustained by wires. Such wires have usually been attached to the top of the fence, and the cross-sills and the latter staked or pinned to the ground.

Our invention consists of wires attached to the top of the fence, passing loosely down through holes in the cross-sills, and attached to stones sunk or anchored in the ground, in combination with wedges or keys resting under the cross-sills, whereby the fence may be tightened up against the wires by the driving of the wedges, as hereinafter described.

A represents a panel or section of fence of ordinary construction. B is one of the cross-sills or supports. The ends of the panels fit in notches $a$ of the cross-sills, having no other support except the wire braces. C is one of the wire braces used at the end of each panel. This wire is of a single length. The center is looped or doubled over the upper rail, as shown at $b$, and the opposite ends $c\ c$ are then carried down loosely through holes $d\ d$ in the sill, near the ends, and firmly attached to stones D D, sunken some twelve or fifteen inches below the surface of the ground. These stones, being firmly embedded, serve as anchors to prevent the wire from being drawn up. E E are wedges or keys of wood, placed under the opposite ends of the sill, resting on the top of the ground, or preferably on blocks $h\ h$. To tighten the fence these wedges are driven firmly under the sill, thereby raising the fence up and straightening the wires, making the whole stiff and taut.

The advantage of this invention is, that the fence may be tightened up to any degree desired, the wires serving as a fixture, and the amount of tension being only limited by the strength of the wires. Heretofore, so far as we are aware, the wire has served only as a connection between the top of the fence and the ends of the sill, in which case it soon grows slack, and serves merely as a stay to the fence, and not as a binder. In such cases the sill has to be staked or pinned down to the ground, or it rests loosely upon the ground without any support.

The work of sinking the stones deep enough to serve as anchors is rapidly done, and such a fence is strong and substantial.

Another advantage is, that the wires passing through the sills serve to prevent them from turning around or getting displaced, as they are liable to do when not so secured.

The panels of fence may be of any desired construction, or made of any material.

What we claim herein as new is—

The wire brace C, secured to the top of the fence, passing loosely down through the sill, and anchored to stones embedded in the ground, in combination with the wedges or keys E E, resting under the sill, and serving to tighten the fence up against the anchor-wires, as shown and described, and for the purpose specified.

In witness whereof we have hereunto signed our names in the presence of two subscribing witnesses.

IRVIN SALTSMAN.
ELIJAH SALTSMAN.

Witnesses:
ALVAH SCHANT,
ALONZO SALTSMAN.